Aug. 18, 1931.  J. R. AULENBACK  1,819,144

INTERNAL MICROMETER GAUGE

Filed May 3, 1929

Inventor
James R. Aulenback

Patented Aug. 18, 1931

1,819,144

UNITED STATES PATENT OFFICE

JAMES ROY AULENBACK, OF WORCESTER, MASSACHUSETTS, ASSIGNOR TO AULENBACK TOOL COMPANY, OF WORCESTER, MASSACHUSETTS, A CORPORATION OF MASSACHUSETTS

INTERNAL MICROMETER GAUGE

Application filed May 3, 1929. Serial No. 360,177.

This invention relates to an adjustable micrometer gauge by which internal diameters may be accurately measured.

It is the object of my invention to provide an improved construction for such internal gauges, by which an improved and simplified gauge is made available for a wide variety of uses and in a form which is of great commercial utility.

Two forms of the invention are shown in the drawings in which

Figure 1:
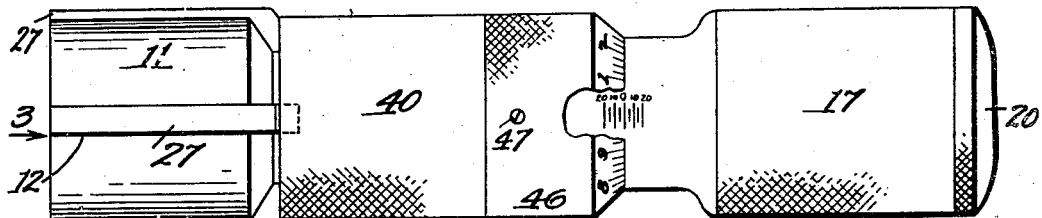
Fig. 1 is a side elevation of one form of my improved gauge.
Figure 2:
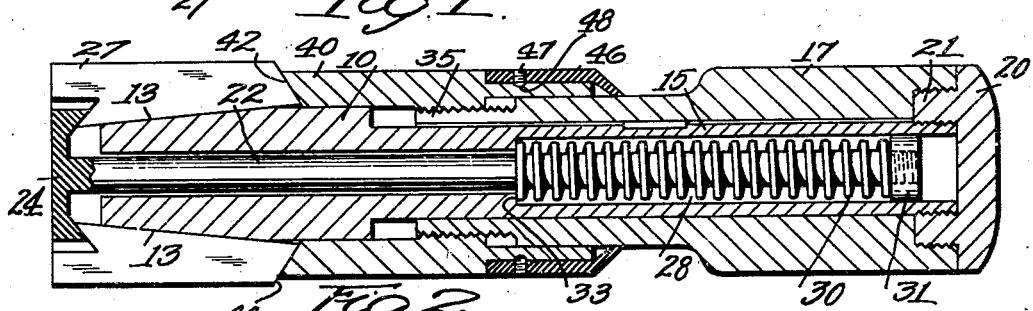
Fig. 2 is a longitudinal sectional view thereof.

Referring particularly to Figs. 1 to 5, I have shown an internal gauge comprising a supporting member 10 having an enlarged cylindrical end portion 11 provided with a plurality of axially extended grooves or guideways 12. The grooves 12 extend the entire length of the enlarged cylindrical portion 11 of the member 10 and the bottom surfaces 13 of the grooves 12 are inclined downwardly and outwardly with respect to the longitudinal axis of the gauge. The supporting member 10 is also provided with a shank portion 15 of reduced diameter, extending axially within a handle 17.

The handle 17 is keyed to the shank portion 15 for rotation therewith and the handle and shank are threaded internally and externally respectively to receive a cap 20 having a doubly threaded flange 21 by which the handle and shank are firmly secured together, in effect forming a single operating member.

A plunger 22 is slidably mounted in an axial opening in the supporting member 10 and at its outer end is provided with an enlarged head 24 which is undercut to receive beveled projections 25 on the end portions of the gauge bars 27.

The shank portion 15 of the supporting member 10 is provided with an enlarged axial recess 28 adapted to receive a spring 30, mounted on the plunger 22 and retained thereon by a nut 31 threaded on the end of the plunger. The inner end of the spring engages a shoulder 33 in the shank 15.

The inner end portion 35 of the handle 17 is threaded externally to receive a sleeve 40 having corresponding internal threads and rotatably mounted on a reduced portion of the handle 17. The left hand end of the sleeve 40, as viewed in the drawings, is undercut as indicated at 42 and engages beveled end surfaces 44 of the gauge bars 27.

A shell or thimble 46 is rotatably mounted on the sleeve 40 and may be secured in any desired position by a set screw 47, seating in an annular groove 48 in the sleeve 40. The shell 46 is graduated, as indicated in Fig. 1, and the adjacent portion of the handle 17 is also graduated.

This form of my improved gauge is designed particularly for measuring holes or openings which are relatively accessible and measurements may be conveniently made by holding the handle 17 in the hand of the operator and by turning the sleeve 40 by the thumb and fore finger. As the sleeve is rotated, it will be simultaneously moved axially in one direction or the other along the handle 17 and supporting member 10, and will cause corresponding axial movement of the gauge bars 27, sliding them up or down along the guideways 12.

The sleeve 40 is effective to move the gauge bars to the left, as viewed in the drawings, and the spring plunger 22 returns the gauge bars to the right, holding them firmly seated against the undercut end of the sleeve 40.

By loosening the screw 47, the shell 46 may be set to indicate a zero position after the gauge has been adjusted to any desired size, and the graduations will thereafter indicate the difference in setting of the gauge over or under the zero or initial diameter.

When it is desired to gauge internal threads, gauge bars of the type indicated at 100

Figures 3, 4, 5:
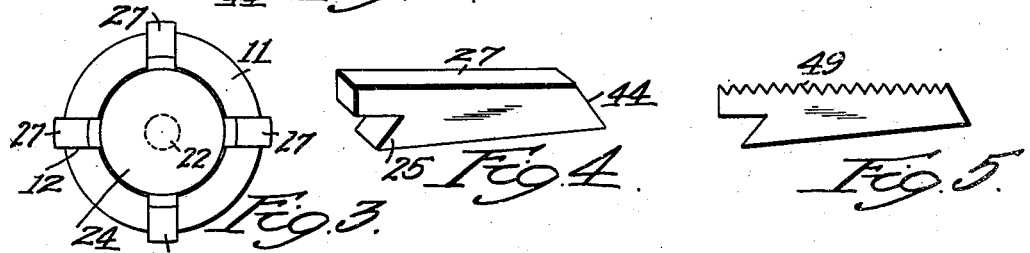
Fig. 3 is an end elevation, looking in the direction of the arrow 3 in Fig. 1.
Fig. 4 is a perspective view of one of the gauge bars.
Fig. 5 is a side elevation of an alternative form of bar.

49 in Fig. 5 may be substituted for the gauge bars 27, which are designed for cylindrical surfaces.

Figure 6:
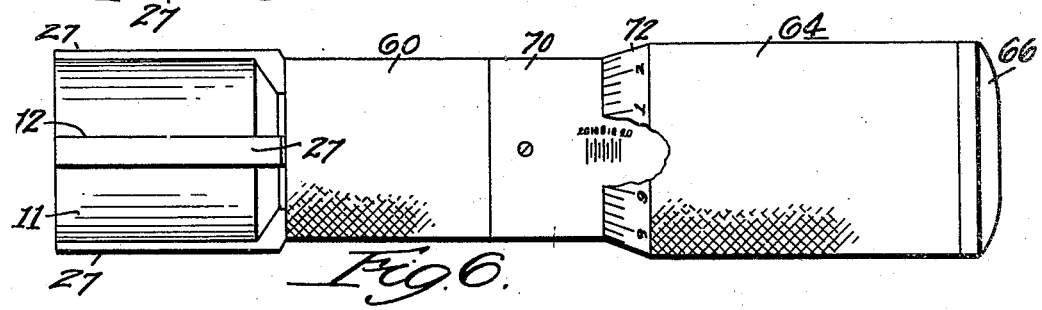
Fig. 6 is a side elevation of a second form of my invention.
Figure 7:
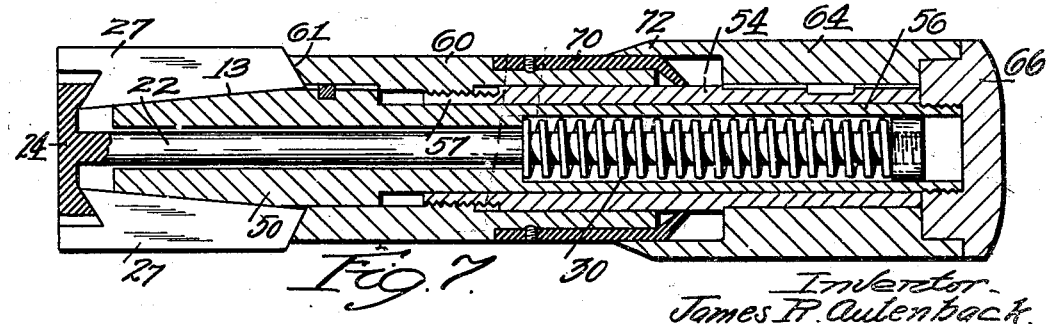
Fig. 7 is a longitudinal section of the gauge shown in Fig. 6.

In Figs. 6 and 7, I have shown a form of my improved gauge more particularly adapted for the gauging of deeper holes or openings.

In this construction, the supporting member 50 is provided with a cylindrical portion 11 having grooves or guide-ways 12 with inclined bottom surfaces 13, exactly as in the form previously described. A plunger 22 and spring 30 are similarly mounted in the supporting member 50 and the plunger is provided with the enlarged head 24 engaging the ends of gauge bars 27, all as previously shown and described.

The internal construction and method of adjustment of the gauge is somewhat different, however, from the form previously described. An inner sleeve 54 is rotatably mounted on the shank 56 of the supporting member 50 and is provided with a reduced threaded end portion 57, the threads of which mesh with corresponding internal threads in an outer sleeve 60, keyed to the supporting member 50 and axially slidable thereon.

The member 60 is provided at its left hand end with an undercut surface 61 engaging the beveled ends of the gauge bars 27, as previously described. A handle 64 is keyed to the inner sleeve 57 and is held from axial movement by a cap 66 threaded on the end of the shank portion 56.

If the outer sleeve 60 is held from rotation and the handle 64 is turned, the inner sleeve 54 will be correspondingly rotated and relative axial movement of the outer sleeve 60 will be produced, thus changing the adjustment of the gauge bars 27. The sleeve 60 may be of any desired length so that it may be inserted in relatively deep holes.

A graduated shell or thimble 70 is mounted on the sleeve 60 and is adjustable thereon as previously described. A recessed portion 72 of the handle 64 is provided with circumferential graduations and projects over the graduated portion of the shell 70. The two sets of graduations cooperate to indicate the radial adjustment of the gauge bars 27, as in the form previously described.

Having described my invention and the advantages thereof I do not wish to be limited to the details herein disclosed otherwise than as set forth in the claims, but what I claim is:—

An internal micrometer gauge comprising a supporting member of circular cross section having a plurality of axially extending guideways formed therein with bottom surfaces inclined to the axis of the gauge, said member having a longitudinal bore and having an extension at one end, gauge bars slidably mounted in said guideways, a spring plunger axially slidable in said supporting member and having an enlarged end engaging the outer ends of said gauge bars, said plunger being effective to yieldingly move said gauge bars endwise and outward in said guideways, a handle enclosing the extension of said supporting member and having an extended hub formed with external screw-threads at its end portion, the end of said support extension being externally threaded and the corresponding end of said handle being recessed and internally threaded, a cap for said handle having an internally and externally threaded annular flange fitting said recess and threaded in said support and handle, whereby said handle is firmly mounted on said support extension and is held from axial movement relative thereto, and a sleeve threaded on the end portion of said hub and forming an adjustable stop engaging the inner ends of said gauge bars, axial movement of said sleeve relative to said supporting member and handle being effected by rotation of said sleeve on said threaded handle hub.

In testimony whereof I have hereunto affixed my signature.

JAMES ROY AULENBACK.